(12) United States Patent
Kaneko et al.

(10) Patent No.: US 6,304,669 B1
(45) Date of Patent: Oct. 16, 2001

(54) PHOTOGRAMMETRIC ANALYTICAL MEASUREMENT SYSTEM

(75) Inventors: Atsumi Kaneko; Masato Hara, both of Tokyo; Toshihiro Nakayama; Atsushi Kida, both of Saitama; Shigeru Wakashiro, Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,329

(22) Filed: Nov. 9, 1998

(30) Foreign Application Priority Data

Nov. 10, 1997 (JP) .................................................... 9-323735

(51) Int. Cl.$^7$ ...................................................... G06K 9/00
(52) U.S. Cl. ........................... 382/154; 382/103; 382/106
(58) Field of Search ..................................... 382/103, 106, 382/154, 285, 286, 209, 151; 348/42, 47, 48, 50; 356/3, 3.01; 702/42, 152, 159, 150, 151

(56) References Cited

U.S. PATENT DOCUMENTS

| | | | |
|---|---|---|---|
| 5,361,217 | * 11/1994 | Makimura et al. | 702/152 |
| 5,642,293 | * 6/1997 | Manthey et al. | 702/42 |
| 5,699,444 | * 12/1997 | Palm | 382/106 |
| 5,806,020 | * 9/1998 | Zykan | 702/159 |
| 5,870,490 | * 2/1999 | Takahashi et al. | 382/154 |

FOREIGN PATENT DOCUMENTS

| | | |
|---|---|---|
| 8214410 | 9/1996 | (JP) . |
| 8233527 | 9/1996 | (JP) . |

* cited by examiner

*Primary Examiner*—Joseph Mancuso
*Assistant Examiner*—Vikkram Bali
(74) *Attorney, Agent, or Firm*—Greenblum & Bernstein, P.L.C.

(57) ABSTRACT

A photogrammetric measurement system produces a survey map based on a set of photographed pictures obtained at two different photographing positions. Each of the pictures includes at least one continuous line and at least three conspicuous points away from the continuous line, with at least one of the conspicuous points and remaining conspicuous points being placed at opposing sides of the continuous line. The set of pictures are produced as a first picture and a second picture. First lines are produced between the conspicuous points on the first picture such that the lines intersect the continuous line, thereby generating intersecting points. Second lines are produced between the conspicuous points on the second picture such that the lines intersect the continuous line, thereby generating further intersecting points. A set of corresponding intersecting points are designated on the first and second pictures, and intersecting points are produced on the survey map based on the designated corresponding intersecting points. A line, connecting the intersecting points, is thus produced on the survey map.

8 Claims, 9 Drawing Sheets

PHOTOGRAMMETRIC ANALYTICAL MEASUREMENT SYSTEM

BACKGROUND OF THE INVENTION

1. Field of the Invention

This invention relates to a photogrammetric analytical measurement system, in which a survey map is produced on the basis of a set of photographed pictures obtained at two different photographing positions.

2. Description of the Related Art

For example, photogrammetry is carried out at a traffic accident spot. The traffic accident spot is photographed by a camera from at least two different positions, and a survey map of the traffic accident spot is produced based on a set of photographed pictures obtained at the different positions.

In particular, a two-dimensional coordinate system is defined on each of the photographed pictures, and two-dimensional positions of the objects, which are recorded on each picture, are determined by the corresponding two-dimensional coordinate system. Then, a three-dimensional coordinate system is defined on the basis of the two sets of two-dimensional coordinate systems, and three-dimensional positions of the recorded objects are calculated with respect to the three-dimensional coordinate system on the basis of the two-dimensional positions of the recorded objects on the two-dimensional coordinate systems. Thus, it is possible to produce a survey map of the traffic accident spot by drawing the objects on a sheet of paper in such a manner that the objects are projected on one of the three planes defined by the three-dimensional system.

Before the three-dimensional positions of the recorded objects can be accurately determined, it is necessary to properly and precisely designate a set of conspicuous points, representing each object, on the photographed pictures with respect to the two-dimensional coordinate systems. Thus, for example, although a continuous line, such as a painted lane marking, is photographed, it is impossible to draw the continuous line on the survey map, because the continuous line has no conspicuous points.

Therefore, conventionally, when a continuous line, such as a painted lane marking, must be drawn on a survey map, markers are placed on and along the continuous line at suitable intervals. Of course, when plural continuous lines are drawn on the survey map, the placing of the markers must be carried out with respect to each of the plural continuous line.

SUMMARY OF THE INVENTION

Therefore, an object of the present invention is to provide a photogrammetric analytical measurement system, in which continuous lines, such as painted lane markings, can be drawn on a survey map without requiring the placement of markers on and along each continuous line.

In accordance with an aspect of the present invention, there is provided a photogrammetric measurement system for producing a survey map based on a set of photographed pictures obtained at two different photographing positions. Each of the photographed pictures includes at least one continuous line image and at least three conspicuous point images off the continuous line image, with at least one of the conspicuous point images and remaining conspicuous point images being placed at opposing sides of the continuous line image. The photogrammetric measurement system comprises: a display unit that displays the set of photographed pictures as a first photographed picture and a second photographed picture; a first line-producing system that produces a first set of line images between the conspicuous point images on the first photographed picture such that the first set of line images intersect the continuous line image so as to generate intersecting point images; a second line-producing system that produces a second set of line images between the conspicuous point images on the second photographed picture such that the second set of line images intersect the continuous line image so as to generate intersecting point images; a designating system that designates a set of corresponding intersecting point images on the first and second pictures; an intersection-point-image producing system that produces intersecting points on the survey map based on the designated corresponding intersecting point images; and a drawing system that draws a line, connecting the produced intersecting points, on the survey map.

Preferably, the production of the intersecting points on the survey map is performed by solving collinear equations on the basis of respective two-dimensional positions of the intersecting point images on the first and second pictures.

The photogrammetric measurement system may further comprises a determining system that determines the line to be drawn is one of a curved line and a straight line; and a selecting system that selects a type of the curved line and the straight line that is drawn.

The first line-producing system may be constituted such that the first set of line images is regularly produced between the conspicuous point images in such a manner that a maximum number of the intersecting point images is generated. Similarly, the second line-producing system may be constituted such that the second set of line images is regularly produced between the conspicuous point images in such a manner that a maximum number of the intersecting point images is generated.

In accordance with another aspect of the present invention, there is provided a photogrammetric measurement method of producing a survey map based on a set of photographed pictures obtained at two different photographing positions. Each of the photographed pictures includes at least one continuous line image and at least three conspicuous point images off the continuous line image, with at least one of the conspicuous point images and remaining conspicuous point images being placed at opposing sides of the continuous line image. The photogrammetric measurement method comprises the steps of: displaying the set of photographed pictures as a first photographed picture and a second photographed picture; producing a first set of line images between the conspicuous point images on the first photographed picture such that the first set of line images intersect the continuous line image so as to generate intersecting point images; producing a second set of line images between the conspicuous point images on the second photographed picture such that the second set of line images intersect the continuous line image so as to generate intersecting point images; designating a set of corresponding intersecting point images on the first and second pictures; producing intersecting points on the survey map based on the designated corresponding intersecting point images; and drawing a line, connecting the produced intersecting points, on the survey map.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

Figure 1:
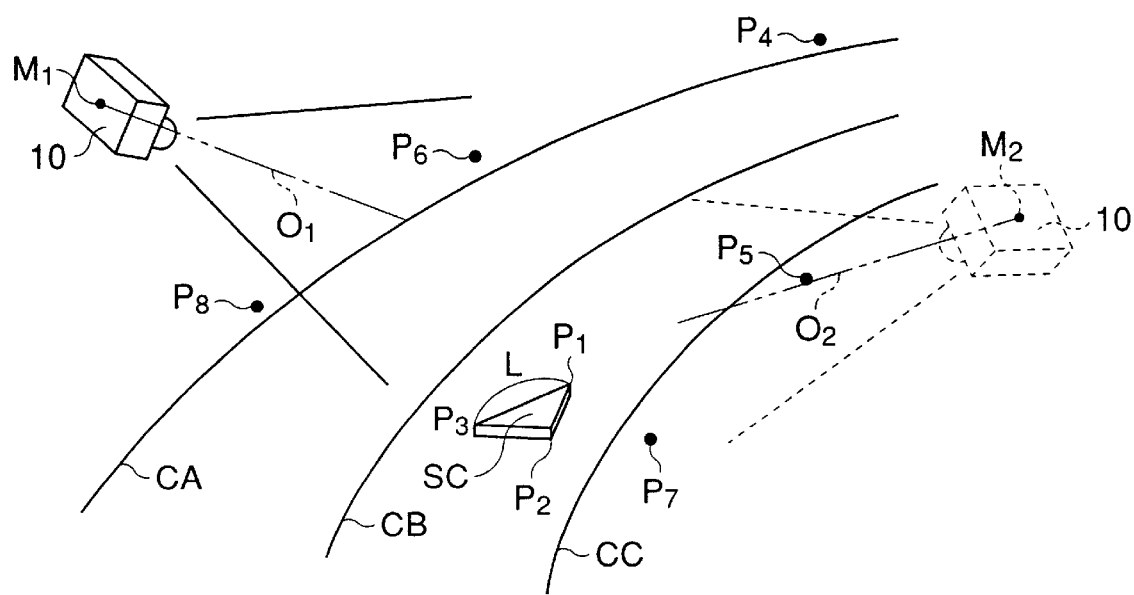
FIG. 1 is a conceptual perspective view showing a part of a traffic road as a spot to be photogrammetrically measured by a photogrammetric measurement system according to the present invention.

FIG. 1 shows a part of a traffic road as a spot to be photogrammetrically measured by a photogrammetric measurement system according to the present invention. In this drawing, three painted lane markings to be drawn on a survey map are indicated by references CA, CB and CC. Note, each of the lane markings CA and CC will be referred to as a side lane marking, and the lane marking CB will be referred to as a central lane marking, hereinafter.

A standard measurement scale SC, which is shaped as an equilateral-triangular plate member, is situated at the spot to be photogrammetrically measured. The three apexes of the equilateral-triangular plate member are utilized as reference points $P_1$, $P_2$ and $P_3$, and a plane, defined by these reference points, is utilized as a reference plane. The sides of the equilateral triangle, defined by the reference points, have a predetermined length of L, which is utilized as a standard measurement length.

In place of the standard measurement scale SC, three respective cone-shaped markers may be suitably positioned at the spot. In this case, a distance between two apexes of the cone-shaped markers is previously measured, for example, with a measuring tape, and is utilized as the standard measurement length. Also, a plane, defined by the three apexes of the cone-shaped markers, is utilized as the reference plane. Nevertheless, of course, it is preferable to use the standard measurement scale SC as shown in FIG. 1.

Also, in FIG. 1, some objective points $P_4$, $P_5$, $P_6$, $P_7$ and $P_8$ are shown, and each objective point is suitably selected as a conspicuous objective point. For example, the conspicuous objective points $P_4$, $P_5$, $P_6$, $P_7$ and $P_8$ may be roots of pylons planted along the road, conspicuous stones or articles placed along the road and so on. If there are no conspicuous objective points along the road, markers can be placed at suitable positions along the road before the photogrammetric measurement is carried out. As shown in FIG. 1, preferably, each of the objective points should be situated beyond the side lane markings CA and CC.

The spot is photographed from two different directions by an electronic still camera, indicated by reference 10. Namely, as shown in FIG. 1, the spot is photographed by the camera 10 placed at a first photographing position $M_1$, shown by a solid line, and is then photographed by the camera 10 placed at a second photographing position $M_2$, shown by a broken line. The photographed spot is stored as a frame of digital image-pixel signals, together with other data, in a suitable memory medium, such as an IC memory card, detachably loaded in the camera 10. At the first photographing position $M_1$, an optical axis of the camera 10 is indicated by reference $O_1$, and, at the second photographing position $M_2$, the optical axis of the camera 10 is indicated by reference $O_2$.

Note, each of the first and second photographing positions $M_1$ and $M_2$ may be defined as a back principal point of the photographing optical system of the camera 10.

Figure 2:
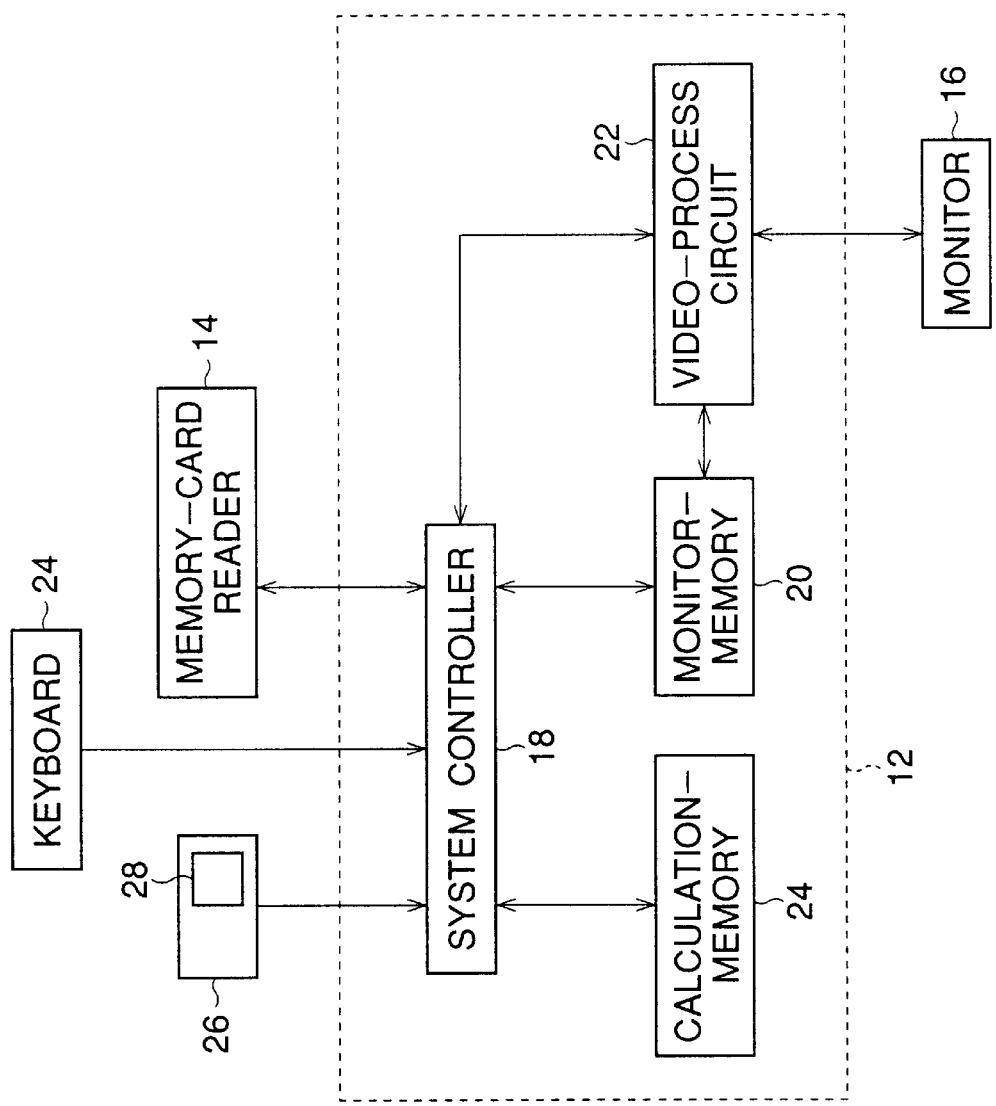
FIG. 2 is a block diagram of the photogrammetirc measurement system according to the present invention.

FIG. 2 shows a block diagram of the photogrammetric measurement system, according to the present invention, which is formed as a computer system 12 having a photogrammetric measurement program installed therein. The computer system 12 is provided with an IC memory-card reader 14, in which the IC memory card, detachable from the camera, is loaded, and the frames of digital image-pixel signals are read from the IC memory card by the computer system 12. The computer system 12 is also provided with a monitor 16 for reproducing photographed pictures based on the frames of digital image-pixel signals read from the IC memory card.

In particular, the computer system 12 comprises a system controller 18 including a central processing unit (CPU), a read-only memory (ROM), a random-access-memory (RAM), an input/output interface (I/O), etc., and the system controller 18 controls the IC memory-card reader 14 so as to read the digital image-pixel signals from the loaded IC memory card. The computer system 12 also comprises a monitor-memory 20, in which the read digital image-pixel signals are temporarily stored, and a video-process circuit 22 for producing a series of video signals on the basis of the digital image-pixel signals, temporarily stored in the monitor-memory 20. Then, the series of video signals is fed in sequence to the monitor 16, whereby the reproduction of the photographed pictures is performed on the monitor 16.

The computer system 12 further includes a calculation-memory 24 which is utilized to temporarily store data when various calculations are performed by the system controller 18 in executing the photogrammetric measurement program. The computer system 12 is provided with a keyboard 24 for inputting various command signals and various data to the system controller 18, and a mouse 26, having a click button 28, for manipulating a cursor displayed on the monitor 16. Of course, as stated hereinafter, the keyboard 24 and the mouse 26 are used during the execution of the measurement program.

Figure 3:
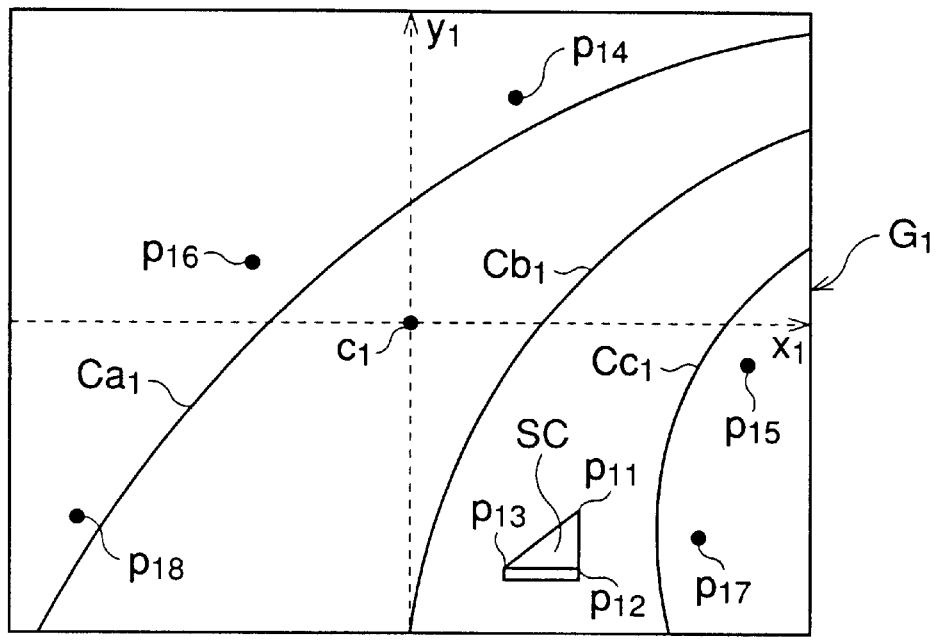
FIG. 3 is a conceptual view showing a first picture photographed at a first photographing position illustrated in FIG. 1.
Figure 4:
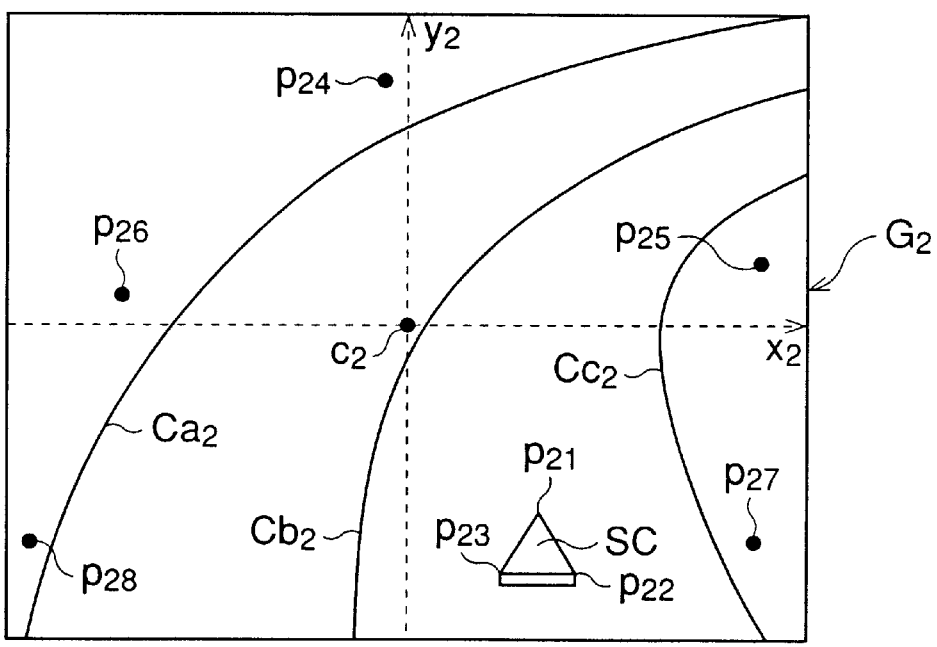
FIG. 4 is a conceptual view showing a second picture photographed at a second photographing position illustrated in FIG. 1.

FIGS. 3 and 4 show a first picture $G_1$ photographed by the camera 10 at the first photographing position $M_1$ and a second picture $G_2$ photographed by the camera 10 at the second photographing position $M_2$, respectively, and the first and second pictures $G_1$ and $G_2$ are simultaneously reproduced and displayed on the screen of the monitor 16. Namely, two frames of digital image-pixel signals, corresponding to the first and second pictures $G_1$ and $G_2$, are read from the IC memory card, and are then stored in the monitor-memory 20, whereby the simultaneous reproduction of the first and second pictures $G_1$ and $G_2$ is performed on the screen of the monitor 16 by the video-process circuit 22.

As shown in FIG. 3, a rectangular $x_1$-$y_1$ coordinate system is defined on the first picture $G_1$, with an origin $c_1$ of the $x_1$-$y_1$ coordinate system being at the photographed center of the first picture $G_1$, through which the optical axis $O_1$ of the camera 10 passes. In this coordinate system, the respective reference points $P_1$, $P_2$ and $P_3$ of the standard measurement scale SC are represented by coordinates $p_{11}(px_{11}, py_{11})$, $p_{12}(px_{12}, py_{12})$ and $p_{13}(px_{13}, py_{13})$, and the respective objective points $P_4$, $P_5$, $P_6$, $P_7$ and $P_8$ are represented by coordinates $p_{14}(px_{14}, py_{14})$, $p_{15}(px_{15}, py_{15})$ $p_{16}(px_{16}, py_{16})$, $p_{17}(px_{17}, py_{17})$ and $p_{18}(px_{18}, py_{18})$. Note, in FIG. 3, the painted lane markings CA, CB and CC are indicated by references $Ca_1$, $Cb_1$ and $Cc_1$.

Also, as shown in FIG. 4, a rectangular $x_2$-$y_2$ coordinate system is defined on the second picture $G_2$, with an origin $c_2$ of the $x_2$-$y_2$ coordinate system being at the photographed center of the second picture $G_2$, through which the optical axis $O_2$ of the camera 10 passes. In this coordinate system, the respective reference points $P_1$, $P_2$ and $P_3$ of the standard measurement scale SC are represented by coordinates $p_{21}$ $(px_{21}, py_{21})$, $p_{22}(px_{22}, py_{22})$ and $p_{23}(px_{23}, py_{23})$, and the respective objective points $P_4$, $P_5$, $P_6$, $P_7$ and $P_8$ are represented by coordinates $p_{24}(px_{24}, py_{24})$, $p_{25}(px_{25}, py_{25})$, $p_{26}$ $(px_{26}, py_{26})$, $p_{27}(px_{27}, py_{27})$ and $px_{28}(px_{28}, py_{28})$. Note, in FIG. 4, the painted lane markings CA, CB and CC are indicated by references $Ca_2$, $Cb_2$ and $Cc_2$.

Figure 5:
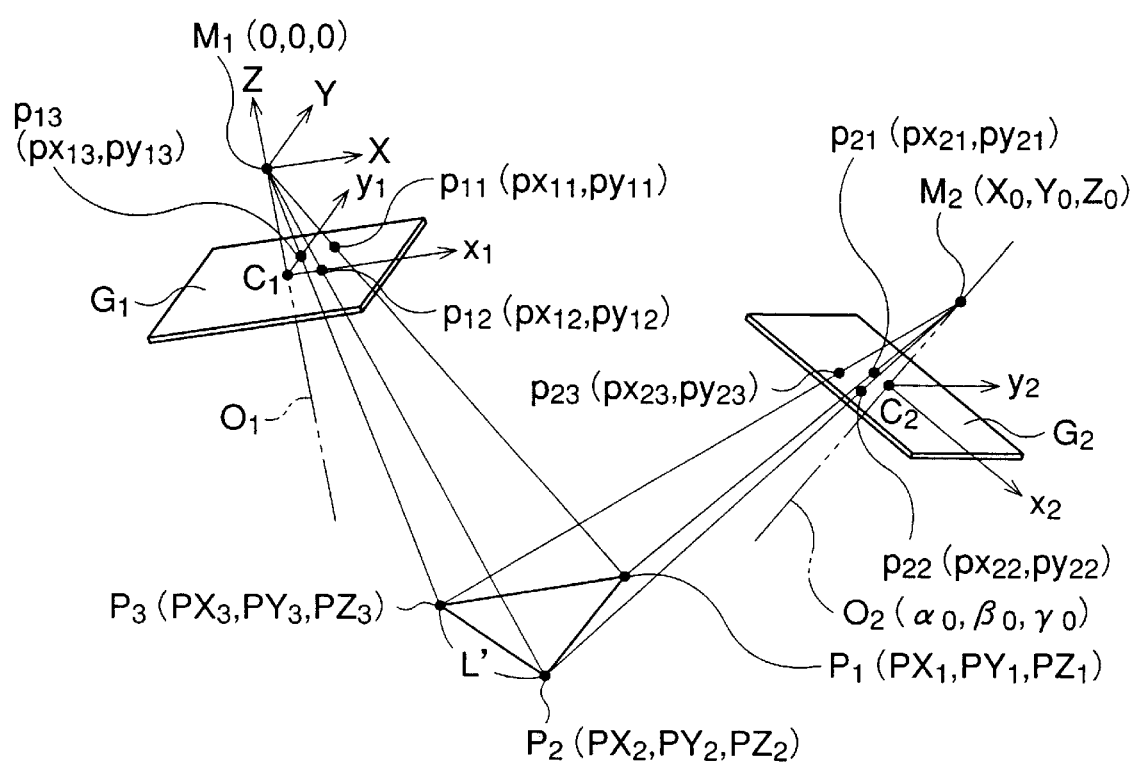
FIG. 5 is a conceptual view showing a relative-positional relationship between the standard scale and the first and second pictures in FIGS. 3 and 4, respectively.

FIG. 5 shows a relative-positional three-dimensional relationship between the standard scale SC, the camera 10, and the first and second pictures $G_1$ and $G_2$. In this case, the standard scale SC is relatively reproduced on the basis of the first and second pictures $G_1$ and $G_2$ placed at the first and second photographing positions $M_1$ and $M_2$, but a size of the standard scale SC is also relative. Thus, a length of the sides of the equilateral triangle, defined by the reference points $P_1$, $P_2$ and $P_3$, is indicated by L'.

In order to three-dimensionally determine the reference points $P_1$, $P_2$ and $P_3$, an X-Y-Z three-dimensional coordinate system is defined, as shown in FIG. 5, and three-dimensional coordinates of the reference points $P_1$, $P_2$ and $P_3$ of the photographed standard scale SC, recorded on each of the first and second pictures $G_1$ and $G_2$, are calculated with respect to this X-Y-Z three-dimensional coordinate system.

As shown in FIG. 5, an origin of the X-Y-Z three-dimensional coordinate system is at the first photographing position $M_1$. Namely, the first photographing position $M_1$ is represented by the origin coordinates (0, 0, 0) of the X-Y-Z three-dimensional coordinate system. Also, a Z-axis of the X-Y-Z three-dimensional coordinate system coincides with the optical axis $O_1$ of the camera 10, placed at the first photographing position $M_1$, represented by angular coordinates (0, 0, 0). Also, in FIG. 5, the second photographing position $M_2$ is represented by coordinates $(X_0, Y_0, Z_0)$, and the optical axis $O_2$ of the camera 10, placed at the second photographing position $M_2$, is represented by angular coordinates $(\alpha_0, \beta_0, \gamma_0)$. Namely, the optical axis $O_2$ of the camera 10 defines angles of $\alpha_0$, $\beta_0$ and $\gamma_0$ with the X-axis, Y-axis and Z-axis of the X-Y-Z three-dimensional coordinate system, respectively.

The reference points $P_1$, $P_2$ and $P_3$ of the standard scale SC are represented by three-dimensional coordinates $P_j(PX_j, PY_j, PZ_j)$ (j=1, 2, 3, . . . ). As shown in FIG. 5, each of the three-dimensional coordinates $[P_1(PX_1, PY_1, PZ_1), P_2(PX_2, PY_2, PZ_2)$ and $P_3(PX_3, PY_3, PZ_3)]$, the corresponding two-dimensional coordinates $[p_{11}(px_{11}, py_{11}), p_{12}(px_{12}, py_{12}), p_{13}(px_{13}, py_{13})]$ recorded on the first picture $G_1$, and the back principal point $(M_1)$ of the camera 10, are aligned with each other on a straight axis. Similarly, each of the three-dimensional coordinates $[P_1(PX_1, PY_1, PZ_1), P_2(PX_2, PY_2, PZ_2)$ and $P_3(PX_3, PY_3, PZ_3)]$, the corresponding two-dimensional coordinates $[p_{21}(px_{21}, py_{21}), p_{22}(px_{22}, py_{22}), p_{23}(px_{23}, py_{23})]$ recorded on the second picture $G_2$, and the back principal point $(M_2)$ of the camera 10, are aligned with each other on a straight axis.

Accordingly, the three-dimensional coordinates $P_j(PX_j, PY_j, Pz_j)$ can be determined by the following collinear equations:

$$PX_j = (PZ_j - Z_0)\frac{a_{11}px_{ij} + a_{21}py_{ij} - a_{31}C}{a_{13}px_{ij} + a_{23}py_{ij} - a_{33}C} + X_0$$

$$PY_j = (PZ_j - Z_0)\frac{a_{12}px_{ij} + a_{22}py_{ij} - a_{32}C}{a_{13}px_{ij} + a_{23}py_{ij} - a_{33}C} + Y_0$$

$(i = 1, 2; j = 1, 2, 3, ...)$

Herein:

$a_{11} = \cos\beta * \sin\gamma$ $a_{12} = -\cos\beta * \sin\gamma$ $a_{13} = \sin\beta$ $a_{21} = \cos\alpha * \sin\gamma + \sin\alpha * \sin\beta * \cos\gamma$ $a_{22} = \cos\alpha * \cos\gamma + \sin\alpha * \sin\beta * \sin\gamma$ $a_{23} = -\sin\alpha * \sin\beta$ $a_{31} = \sin\alpha * \sin\gamma + \cos\alpha * \sin\beta * \cos\gamma$ $a_{32} = \sin\alpha * \cos\gamma + \cos\alpha * \sin\beta * \sin\gamma$ $a_{33} = \cos\alpha * \cos\beta$ Note that, in these equations, C indicates a principal focal length of the camera 10, which is defined as a distance between the back principal point $(M_1)$ and the photographing center $(c_1)$ of the first picture $G_1$, and a distance between the back principal point $(M_2)$ and the photographing center $(c_2)$ of the second picture $G_2$. Also note, i corresponds to a number of the pictures $G_1$ and $G_2$; and j corresponds to a number of the points displayed on the screen of the monitor 16.

Figure 6:
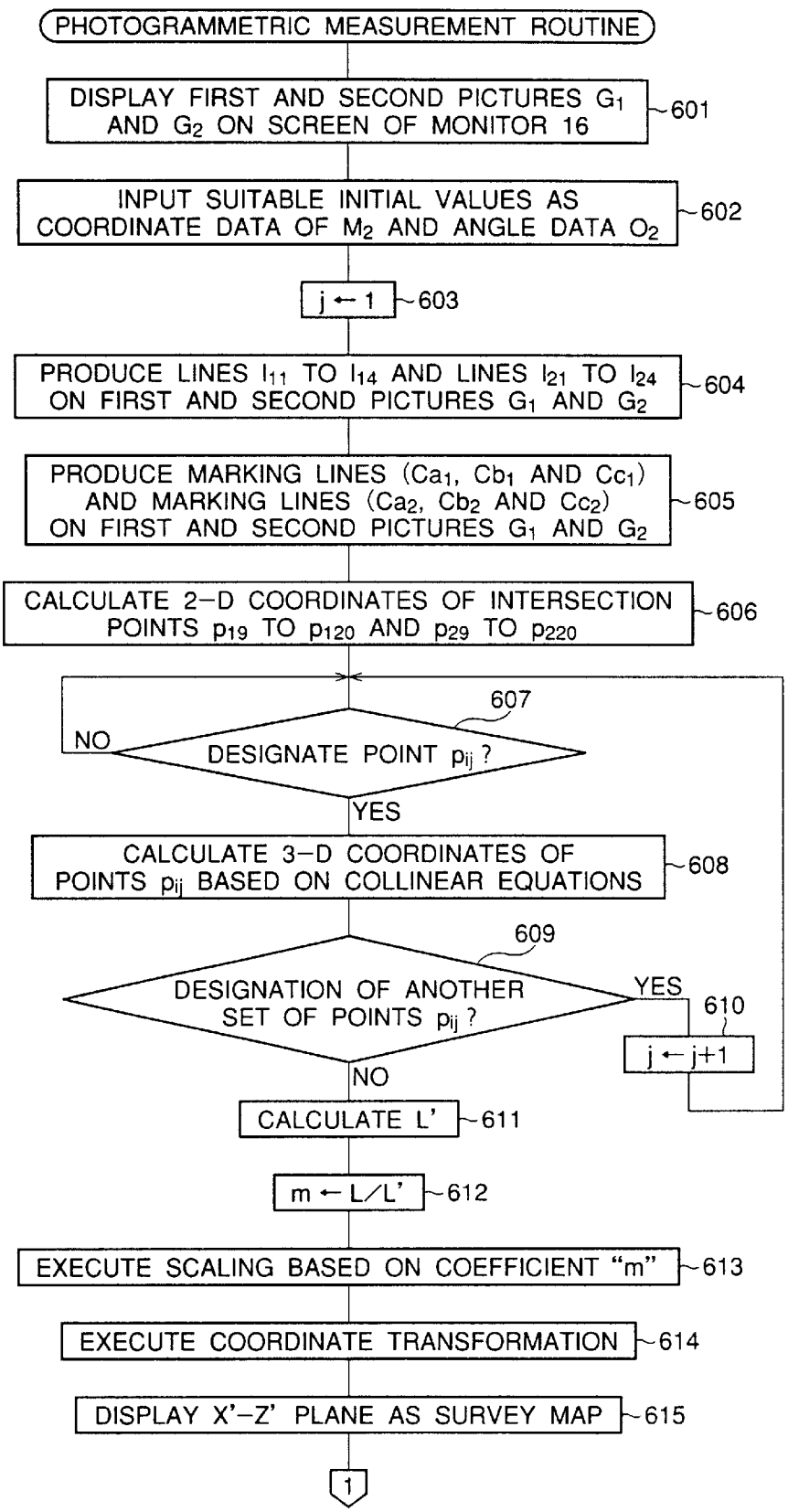
FIG. 6 is a part of a flowchart of a photogrammetric measurement routine according to the present invention.
Figure 7:
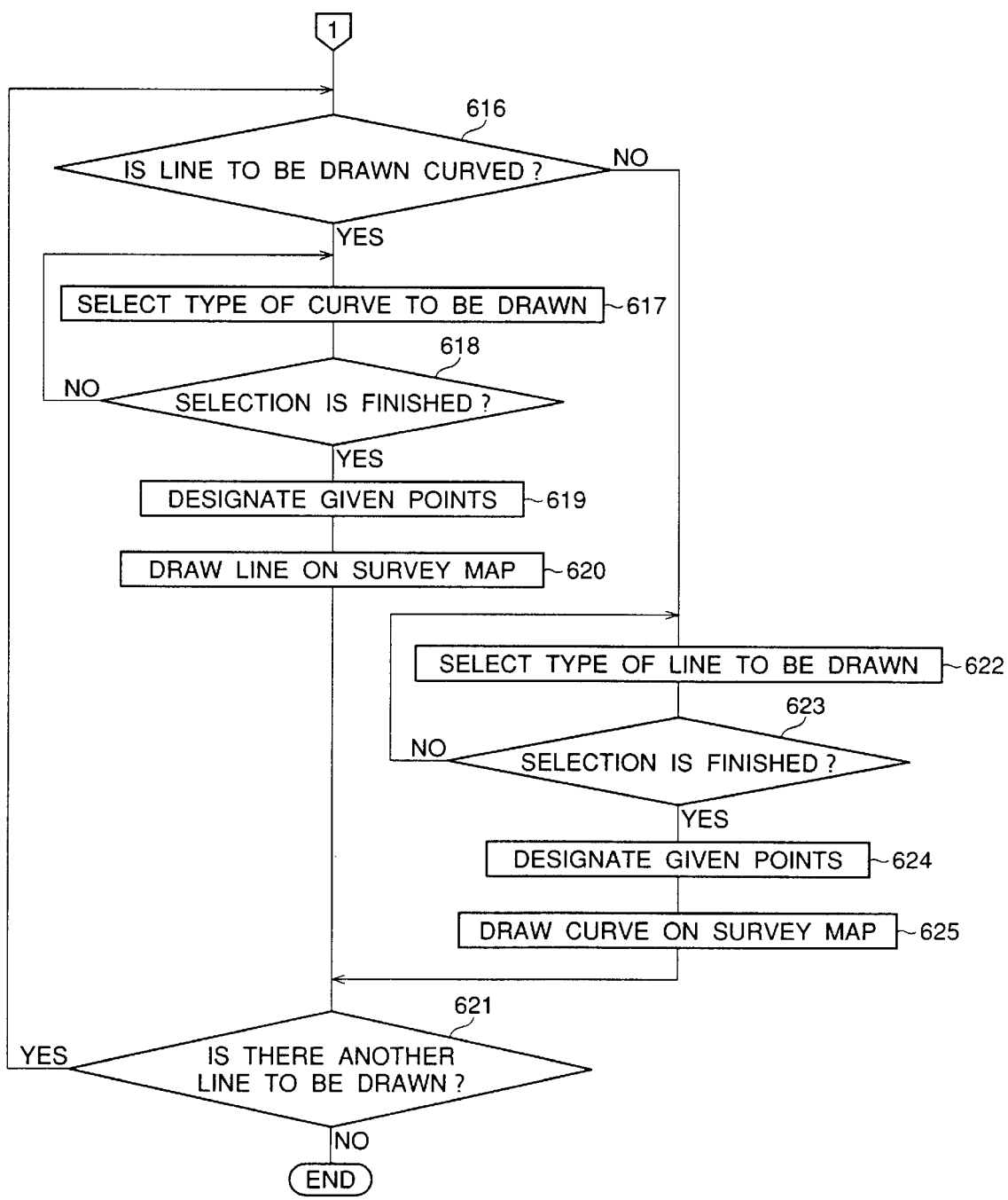
FIG. 7 is the remaining part of the flowchart of the photogrammetric measurement routine according to the present invention.

FIGS. 6 and 7 show a flowchart of a photogrammetric measurement routine, executed in the computer system 12 shown in FIG. 2, in which a survey map is developed based upon the first and second pictures $G_1$ and $G_2$, shown in FIGS. 3 and 4.

At step 601, the first and second pictures $G_1$ and $G_2$ are simultaneously reproduced and displayed on the screen of the monitor 16. Namely, a set of frame numbers, corresponding to the first and second pictures $G_1$ and $G_2$, is selected by inputting a set of frame-number data via the keyboard 24 and thus two frames of digital image-pixel signals, corresponding to the first and second pictures $G_1$ and $G_2$, are read from the IC memory card loaded in the memory-card reader 14, resulting in the simultaneous reproduction of the first and second pictures $G_1$ and $G_2$ on the screen of the monitor 16. In this case, preferably, a color of the objective points, represented by the coordinates ($p_{14}$ and $p_{24}$; $p_{15}$ and $p_{25}$; $p_{16}$ and $p_{26}$; $p_{17}$ and $p_{27}$; and $p_{18}$ and $p_{28}$), is changed to a complementary color with respect to a back ground color of the monitor 16, whereby each of these objective points can be easily distinguished as a conspicuous point by an operator.

At step 602, as coordinate data ($X_0$, $Y_0$, $Z_0$) of the second photographing position $M_2$ and as angular coordinate data ($\alpha_0$, $\beta_0$, $\gamma_0$) of the optical axis $O_2$, suitable initial values (except for zero) are inputted to the computer system 12 through the keyboard 24. Then, at step 603, a counter j is initialized, i.e. the counter j is made to be "1".

Figure 8:
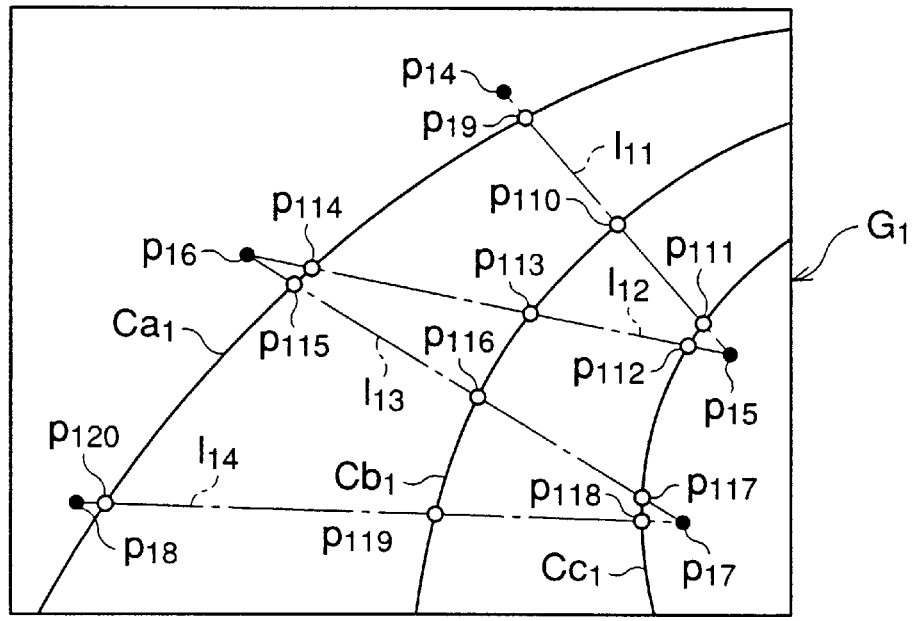
FIG. 8 is a conceptual view, corresponding to the first picture of FIG. 3, for assisting an explanation of the photogrammetric measurement routine.
Figure 9:
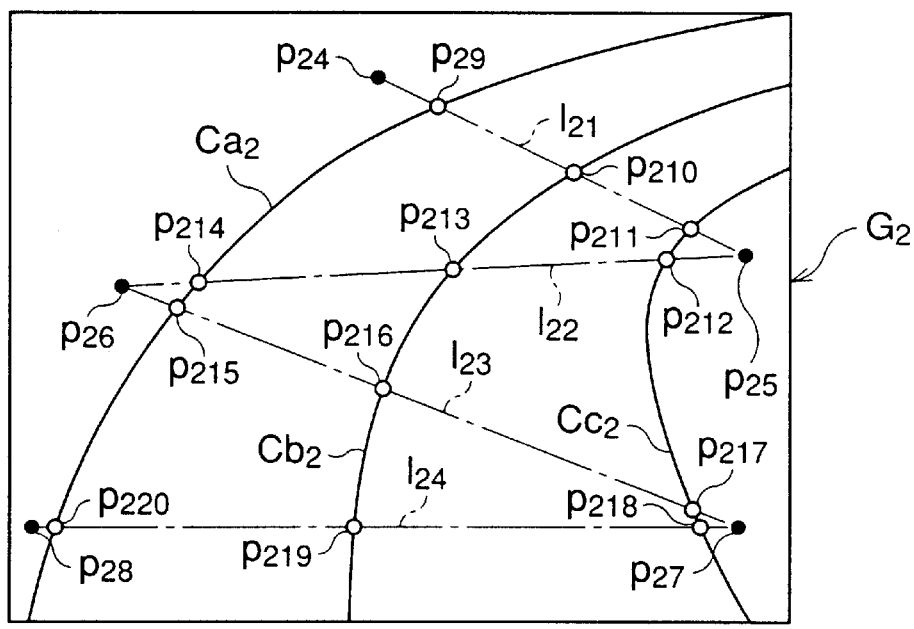
FIG. 9 is a conceptual view, corresponding to the second picture of FIG. 4, for assisting an explanation of the photogrammetric measurement routine.

At step 604, as shown in FIGS. 8 and 9, a first set of lines $l_{11}$, $l_{12}$, $l_{13}$ and $l_{14}$ and a second set of lines $l_{21}$, $l_{22}$, $l_{23}$ and $l_{24}$ are produced on the first and second pictures $G_1$ and $G_2$ on the screen of the monitor 16, respectively. As is apparent from these drawings, the respective lines $l_{11}$ and $l_{21}$ are obtained as a line segment connecting the objective points $p_{14}$ and $p_{15}$ and as a line segment connecting the objective points $p_{24}$ and $p_{25}$; the respective lines $l_{12}$ and $l_{22}$ are obtained as a line segment connecting the objective points $p_{15}$ and $p_{16}$ and as a line segment connecting the objective points $p_{25}$ and $p_{26}$; the respective lines $l_{13}$ and $l_{23}$ are obtained as a line segment connecting the objective points $p_{16}$ and $p_{17}$ and as a line segment connecting the objective points $p_{26}$ and $p_{27}$; and the respective lines $l_{14}$ and $l_{24}$ are obtained as a line segment connecting the objective points $p_{17}$ and $p_{18}$ and as a line segment connecting the objective points $p_{27}$ and $p_{28}$.

At step 605, lane marking lines, representing the lane markings $Ca_1$, $Cb_1$ and $Cc_1$, and lane marking lines, representing the lane markings $Ca_2$, $Cb_2$ and $Cc_2$, are produced on the first and second pictures $G_1$ and $G_2$, respectively. Thus, as shown in FIG. 8, intersecting points $p_{19}$ to $p_{120}$ are generated between the lines segments $l_{11}$ to $l_{14}$ and the lane marking lines ($Ca_1$, $Cb_1$ and $Cc_1$), and, as shown in FIG. 9, intersecting points $p_{29}$ to $P_{220}$ are generated between the lines segments $l_{21}$ to $l_{24}$ and the lane marking lines ($Ca_2$, $Cb_2$ and $Cc_2$). In this case, each of the intersecting points $p_{19}$ to $p_{120}$ and $p_{29}$ to $p_{220}$ may be blinked on and off, or a color of each intersecting point may be changed to a complementary color with respect to a background color of the monitor 16, whereby each of these intersecting points can be easily distinguished as a conspicuous point by an operator.

Note, of course, in FIG. 8, the points $p_{19}$, $p_{114}$, $p_{115}$ and $p_{120}$ represent the lane marking line $Ca_1$; the points $P_{110}$, $p_{113}$, $p_{116}$ and $p_{119}$ represent the lane marking line $Cb_1$; the points $p_{111}$, $p_{112}$, $p_{117}$ and $p_{118}$ represent the lane marking line $Cc_1$. Similarly, in FIG. 9, the points $p_{29}$, $p_{214}$, $p_{215}$ and $p_{220}$ represent the lane marking line $Ca_2$; the points $p_{210}$, $p_{213}$, $p_{216}$ and $p_{219}$ represent the lane marking line $Cb_2$; the points $p_{211}$, $p_{212}$, $p_{217}$ and $p_{218}$ represent the lane marking line $Cc_2$.

At step 606, two-dimensional coordinates of each of the intersecting points $p_9$ to $p_{120}$ are calculated with respect to the rectangular $x_1$-$y_1$ coordinate system defined on the first picture $G_1$, and two-dimensional coordinates of each of the intersecting points $p_{29}$ to $p_{220}$ are calculated with respect to the rectangular $x_2$-$y_2$ coordinate system defined on the second picture $G_2$.

In step 607, it is determined whether a set of points $p_{ij}$($p_{1j}$ and $p_{2j}$) are designated and clicked, on the first and second pictures $G_1$ and $G_2$ displayed on the screen of the monitor 16, with the cursor manipulated by the mouse 26. For example, when the set of points ($p_{11}$ and $p_{21}$) are designated and clicked with the cursor manipulated by the mouse 26, the set of two-dimensional coordinates $p_{11}$($px_{11}$, $py_{11}$) and $p_{21}$($px_{21}$, $py_{21}$) are retrieved by the computer system 12.

After the designation of the set of points $P_{ij}$($p_{11}$ and $P_{21}$), at step 608, the above-mentioned collinear equations are solved on the basis of the retrieved coordinates, and three-dimensional coordinates $P_{j(=1)}$($PX_j$, $PY_j$, $PZ_j$) of the point $p_{j(=1)}$ are determined. Thus, primary-approximate data of the three-dimensional coordinates ($X_0$, $Y_0$, $Z_0$) of the second photographing position $M_2$ and the angle coordinates ($\alpha_0$, $\beta_0$, $\gamma_0$) of the optical axis $O_2$ are determined, i.e. the initial coordinate data ($X_0$, $Y_0$, $Z_0$) and the initial angular coordinate data ($\alpha_0$, $\beta_0$, $\gamma_0$), inputted at step 602, are updated by the primary-approximate data.

At step 609, it is determined whether or not another set of points $p_{ij}$ should be designated and clicked with the cursor manipulated by the mouse 26. When another set of points $p_{ij}$ should be further designated, at step 610, the counter j is incremented by "1". Thereafter, the routine comprising steps 607 and 608 is again executed.

Note, when the approximation calculation based on the collinear equations is repeated more than three times, the updated coordinate data ($X_0$, $Y_0$, $Z_0$) and the updated angular coordinate data ($\alpha_0$, $\beta_0$, $\gamma_0$) are sufficiently approximated.

At step 609, when there are no further set of points $p_{ij}$ to be designated, i.e. when the designation of all of the sets of points $p_{ij}$(j=20) are completed, at step 611, the relative length L' of the sides of the photographed standard scale SC is calculated on the basis of the determined three-dimensional coordinates $P_1$($PX_1$, $PY_1$, $PZ_1$), $P_2$($PX_2$, $PY_2$, $PZ_2$) and $P_3$($PX_3$, $PY_3$, $PZ_3$). Then, at step 612, a coefficient "m" is calculated as follows:

$$m \leftarrow L/L'$$

At step 613, scaling is executed, using the coefficient "m", between the determined three-dimensional coordinates $P_j$($PX_j$, $PY_j$, $PZ_j$), so as to obtain a real spatial relationship therebetween. Then, at step 614, the X-Y-Z three-dimensional coordinate system is transformed into an X'-Y'-Z' three-dimensional coordinate system defined as shown in FIG. 10.

Figure 10:
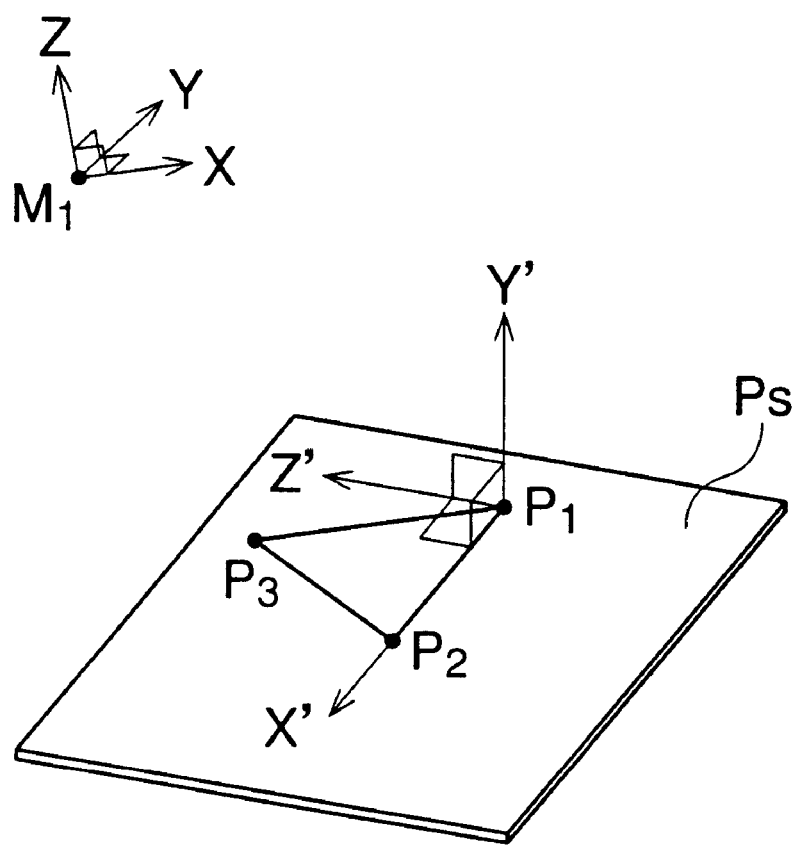
FIG. 10 is a conceptual view showing a three-dimensional coordinate system for producing a survey map in accordance with the photogrammetric measurement system according to the present invention.

As is apparent from FIG. 10, an origin of the X'-Y'-Z' three-dimensional coordinate system is at the reference point $P_1$, and the X'-axis thereof is defined by the points $P_1$ and $P_2$. Also, the X'- and Z'-axes of the coordinate system define a plane "Ps", which includes a triangular plane area defined by the reference points $P_1$, $P_2$ and $P_3$.

Note, in the example of FIG. 10, although the origin of the X'-Y'-Z' three-dimensional coordinate system coincides with the reference point $P_1$, the origin may be at any location included in the plane "Ps". Also, note, if necessary, the X'-Y'-Z' three-dimensional coordinate system may be defined with respect to another plane, for example, defined by the objective points $P_4$, $P_5$ and $P_6$, such that the two axes of the X'-Y'-Z' three-dimensional coordinate system are included in the defined plane.

Figure 11:
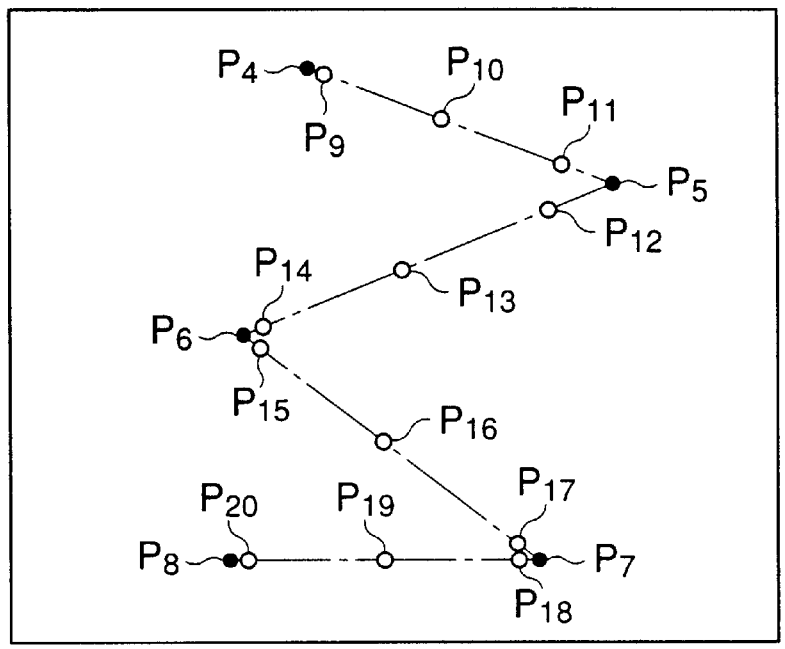
FIG. 11 is a conceptual view showing a picture displayed as a survey map on a screen of a monitor.

At step 615, for example, the X'-Z' plane or plane "Ps", on which the transformed three-dimensional coordinates $P_j$($PX_j$, $PY_j$, $PZ_j$) are projected and recorded, is displayed as a survey map on the monitor 16, as shown in FIG. 11. Note, in this drawing, the reference points $P_1$, $P_2$ and $P_3$ of the standard scale SC are omitted for simplicity of illustration.

At step 616, it is determined whether a line to be drawn by a given set of intersecting points $P_j$($P_9$, $P_{14}$, $P_{15}$ and $P_{20}$;

$P_{10}$, $P_{13}$, $P_{16}$ and $P_{19}$; $P_{11}$, $P_{12}$, $P_{17}$ and $P_{18}$), shown in FIG. 11, is curved or straight. If the line to be drawn is curved, at step 617, a type of curved line to be drawn is selected from a group of, for example, an arcuate line, a quadrant line, a semi-circular line, and a circular line. Note, in this embodiment, of course, the arcuate line is selected as the type of curved line to drawn. Then, at step 618, it is determined whether the selection is finished.

Figure 12:
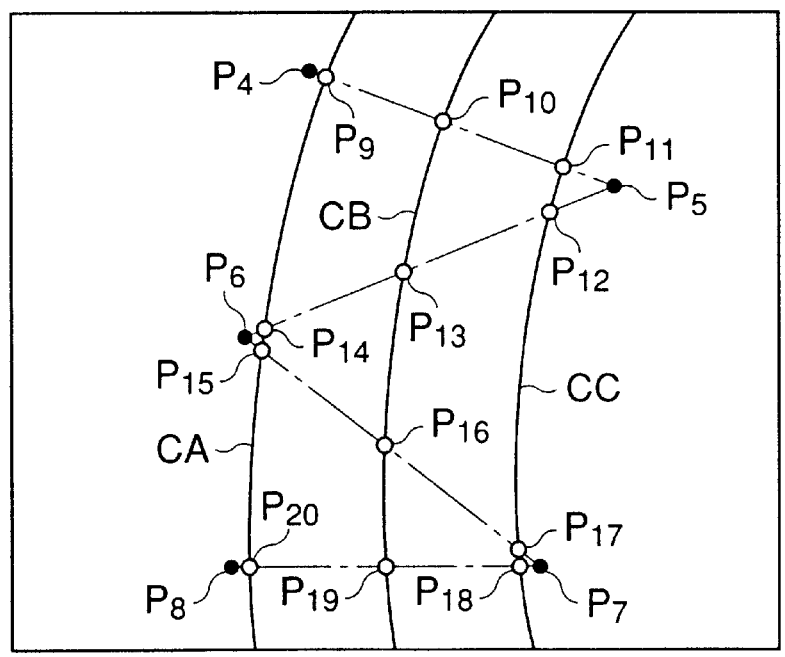
FIG. 12 is a conceptual view, corresponding to the picture of FIG. 11, on which three lane markings are drawn by the photogrammetric measurement system according to the present invention.

After the selection is finished, at step 619, for example, the set of intersecting points $P_9$, $P_{14}$, $P_{15}$ and $P_{20}$ is designated and clicked by the cursor manipulated by the mouse 26. Then, at step 620, a curved line, representing the lane marking CA, is drawn on the displayed survey map, as shown in FIG. 12. At step 621, it is determined whether there is another line to be drawn. If there is another line to be drawn, the routine returns to step 616. Thus, the other lines, representing the respective lane markings CB and CC, are drawn on the displayed survey map, as shown in FIG. 12.

At step 616, if the line to be drawn is straight, at step 622, a type of straight line to be drawn is selected from a group of, for example, a full-continuous line passing through the displayed survey map, a semi-continuous line having a terminal end on the displayed survey map, and a section of line having both terminal ends on the displayed survey map. Then, at step 623, it is determined whether the selection is finished.

After the selection is finished, at step 624, at least two intersecting points, included in the line to be drawn, are designated and clicked by the cursor manipulated by the mouse 26, and then, at step 625, a straight line is drawn on the displayed survey map. Thereafter, at step 621, it is determined whether there is another line to be drawn. If there is another line to be drawn, the routine returns to step 616.

As is apparent from the foregoing, according to the present invention, it is possible to effectively draw a plurality of continuous lines on a survey map without placing markers on and along each of the continuous lines.

In the aforesaid embodiment, in order to obtain as many as possible the intersecting points between the lines segments ($l_{11}$ to $l_{14}$; $l_{21}$ to $l_{24}$) and the lane marking lines ($Ca_1$, $Cb_1$ and $Cc_1$; $Ca_2$, $Cb_2$ and $Cc_2$), and in order to easily distinguish the data on the screen of the monitor 16, the line segments ($l_{11}$ to $l_{14}$; $l_{21}$ to $l_{24}$) are produced in a zigzag fashion between the objective points ($p_{14}$, $p_{15}$, $p_{16}$, $p_{17}$ and $p_{18}$; and $p_{24}$, $p_{25}$, $p_{26}$, $p_{27}$ and $p_{28}$), as shown in FIGS. 8 and 9, such that each of the line segments intersects all of the corresponding lane marking lines ($Ca_1$, $Cb_1$ and $Cc_1$; $Ca_2$, $Cb_2$ and $Cc_2$). Nevertheless, another set of lines may be further produced between, for example, the objective points ($P_{14}$ and $P_{17}$; and $p_{24}$ and $P_{27}$), so that the number of intersecting points on the lane marking lines ($Ca_1$, $Cb_1$ and $Cc_1$; and $Ca_2$, $Cb_2$ and $Cc_2$) is increased, whereby the painted lane markings CA, CB and CC can be more accurately drawn on the survey map.

Finally, it will be understood by those skilled in the art that the foregoing description is of preferred embodiments of the system, and that various changes and modifications may be made to the present invention without departing from the spirit and scope thereof.

The present disclosure relates to subject matter contained in Japanese Patent Application No. 9-323735 (filed on Nov. 10, 1997) which is expressly incorporated herein, by reference, in its entirety.

What is claimed is:

1. A photogrammetric measurement system for producing a survey map based on a set of photographed pictures obtained at two different photographing positions, each of said photographed pictures including at least one continuous line image and at least three conspicuous point images off said continuous line image, at least one of said conspicuous point images and remaining conspicuous point images being placed at opposing sides of said continuous line image, said photogrammetric measurement system comprising:

a display unit that displays said set of photographed pictures as a first photographed picture and a second photographed picture;

a first line-producing system that produces a first set of line images between said conspicuous point images on said first photographed picture such that said first set of line images intersect said continuous line image so as to generate intersecting point images;

a second line-producing system that produces a second set of line images between said conspicuous point images on said second photographed picture such that said second set of line images intersect said continuous line image so as to generate intersecting point images;

a designating system that designates a set of corresponding intersecting point images on said first and second pictures;

an intersection-point-image producing system that produces intersecting points on said survey map based on said designated corresponding intersecting point images; and a drawing system that draws a line, connecting said produced intersecting points, on said survey map.

2. A photogrammetric measurement system as set forth in claim 1, wherein the production of said intersecting points on said survey map is performed by solving collinear equations on the basis of respective two-dimensional positions of said intersecting point images on said first and second pictures.

3. A photogrammetric measurement system as set forth in claim 1, further comprising:

a determining system that determines said line to be drawn is one of a curved line and a straight line; and a selecting system that selects a type of said curved line and said straight line that is drawn.

4. A photogrammetric measurement system as set forth in claim 1, wherein said first line-producing system is constituted such that said first set of line images is regularly produced between said conspicuous point images in such a manner that a maximum number of said intersecting point images is generated, and said second line-producing system is constituted such that said second set of line images is regularly produced between said conspicuous point images in such a manner that a maximum number of said intersecting point images is generated.

5. A photogrammetric measurement method of producing a survey map based on a set of photographed pictures obtained at two different photographing positions, each of said photographed pictures including at least one continuous line image and at least three conspicuous point images off said continuous line image, at least one of said conspicuous point images and remaining conspicuous point images being placed at opposing sides of said continuous line image, said photogrammetric measurement method comprising the steps of:

displaying said set of photographed pictures as a first photographed picture and a second photographed picture;

producing a first set of line images between said conspicuous point images on said first photographed picture such that said first set of line images intersect said continuous line image so as to generate intersecting point images;

producing a second set of line images between said conspicuous point images on said second photographed picture such that said second set of line images intersect said continuous line image so as to generate intersecting point images;

designating a set of corresponding intersecting point images on said first and second pictures;

producing intersecting points on said survey map based on said designated corresponding intersecting point images; and drawing a line, connecting said produced intersecting points, on said survey map.

6. A photogrammetric measurement method as set forth in claim 5, wherein the production of said intersecting points on said survey map is performed by solving collinear equations on the basis of respective two-dimensional positions of said intersecting point images on said first and second pictures.

7. A photogrammetric measurement method as set forth in claim 5, further comprising the steps of:

determining whether said line to be drawn is one of a curved line and a straight line; and selecting a type of said curved line and said straight line that is drawn.

8. A photogrammetric measurement method as set forth in claim 5, wherein said first set of line images is regularly produced between said conspicuous point images in such a manner that a maximum number of said intersecting point images is generated, and said second set of line images is regularly produced between said conspicuous point images in such a manner that a maximum number of said intersecting point images are generated.

* * * * *